United States Patent
Preis et al.

(10) Patent No.: US 10,823,229 B2
(45) Date of Patent: Nov. 3, 2020

(54) ROLLING-ELEMENT BEARING INCLUDING AN ELECTRICALLY INSULATING LAYER

(71) Applicant: Aktiebolaget SKF, Gothenburg (SE)

(72) Inventors: Karl Preis, Traun (AT); Ronald Berger, Ansfelden (AT); Helmut Weninger, Steyr (AT)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 15/921,210

(22) Filed: Mar. 14, 2018

(65) Prior Publication Data

US 2018/0274594 A1    Sep. 27, 2018

(30) Foreign Application Priority Data

Mar. 24, 2017 (DE) .......................... 10 2017 205 015
Mar. 24, 2017 (DE) .................... 20 2017 101 725 U

(51) Int. Cl.
*F16C 41/00* (2006.01)
*F16C 19/52* (2006.01)
(Continued)

(52) U.S. Cl.
CPC ............ *F16C 41/002* (2013.01); *F16C 19/52* (2013.01); *F16C 33/586* (2013.01); *F16C 33/62* (2013.01);
(Continued)

(58) Field of Classification Search
CPC ........ F16C 19/25; F16C 33/586; F16C 33/62; F16C 41/02; F16C 2202/10;
(Continued)

(56) References Cited

U.S. PATENT DOCUMENTS 5,375,933 A    12/1994   Mizutani et al.
5,975,764 A    11/1999   Okada et al.
(Continued)

FOREIGN PATENT DOCUMENTS

CN    201041196 Y    3/2008
CN    201100311 Y    8/2008
(Continued)

OTHER PUBLICATIONS

Kim, Hyung-Jun. et al; "The electrical insulation behavior and sealing effects of plasma-sprayed alumina-titania coatings"; Surface and Coatings Technology 140 (2001) 293-301; Revised Feb. 16, 2001; Elsevier.

*Primary Examiner* — James Pilkington

(74) *Attorney, Agent, or Firm* — J-Tek Law PLLC; Scott T. Wakeman; Mark A. Ussai

(57) ABSTRACT

A rolling-element bearing includes a first ring element, a second ring element, a plurality of rolling elements rotatably disposed between the first ring element and the second ring element, and an electrically insulating layer on a surface of the first ring element. The electrically insulating layer is a ceramic layer containing a mixture of aluminum oxide ($Al_2O_3$) and titanium oxide, and the insulating layer includes titanium compounds that contain reduced titanium oxide ($TiO_x$) and/or metallic titanium (Ti), and the insulating layer further includes a cured synthetic resin sealer.

15 Claims, 1 Drawing Sheet

(51) Int. Cl.
*F16C 33/58* (2006.01)
*F16C 33/62* (2006.01)
*H01B 3/12* (2006.01)

(52) U.S. Cl.
CPC ............ *H01B 3/12* (2013.01); *F16C 2202/10* (2013.01); *F16C 2202/32* (2013.01); *F16C 2204/20* (2013.01); *F16C 2206/44* (2013.01); *F16C 2208/90* (2013.01); *F16C 2223/42* (2013.01)

(58) Field of Classification Search
CPC .............. F16C 2202/20; F16C 2204/20; F16C 2206/44; F16C 2208/90; F16C 2223/42
See application file for complete search history.

(56) References Cited

U.S. PATENT DOCUMENTS

| | | | |
|---|---|---|---|
| 8,044,544 B2 | 10/2011 | Sone et al. | |
| 8,425,120 B2 * | 4/2013 | Konno | F16C 19/52 384/476 |
| 9,115,755 B2 | 8/2015 | Kolev et al. | |
| 9,646,737 B2 * | 5/2017 | Martin | F16C 33/62 |
| 10,260,562 B2 * | 4/2019 | Takeuchi | F16C 33/62 |
| 2001/0014545 A1 | 8/2001 | Ito et al. | |
| 2004/0066997 A1 | 4/2004 | Inukai et al. | |
| 2005/0094910 A1 * | 5/2005 | Tsuji | F16C 19/52 384/476 |
| 2012/0008890 A1 | 1/2012 | Schwarz et al. | |
| 2013/0084033 A1 | 4/2013 | Martin et al. | |
| 2015/0010262 A1 | 1/2015 | Hosenfeldt et al. | |
| 2015/0380124 A1 * | 12/2015 | Martin | F16C 33/62 384/492 |

FOREIGN PATENT DOCUMENTS

| | | |
|---|---|---|
| CN | 101638515 A | 2/2010 |
| CN | 101457791 B | 7/2010 |
| CN | 202215610 U | 5/2012 |
| CN | 101395394 B | 12/2012 |
| CN | 203412948 U | 1/2014 |
| CN | 103671554 A | 3/2014 |
| CN | 204610553 U | 9/2015 |
| CN | 105051240 A | 11/2015 |
| DE | 69016321 T2 | 8/1995 |
| DE | 10137785 A1 | 2/2003 |
| DE | 102013104186 A1 | 10/2014 |
| DE | 102013223677 A1 | 5/2015 |
| DE | 102013225341 A1 | 6/2015 |
| DE | 102014202827 A1 | 8/2015 |
| EP | 256518 A1 | 2/1988 |
| EP | 0494446 A1 | 7/1992 |
| EP | 1528274 B1 | 6/2009 |
| EP | 2989338 A1 | 3/2016 |
| GB | 1591560 A | 6/1981 |
| JP | H101182621 A | 7/1989 |
| JP | H101210618 A | 8/1989 |
| JP | H01288618 A | 11/1989 |
| JP | H0552223 A | 3/1993 |
| JP | H05240255 A | 9/1993 |
| JP | H0674240 A | 3/1994 |
| JP | H06117441 A | 4/1994 |
| JP | H06147231 A | 5/1994 |
| JP | H06173960 A | 6/1994 |
| JP | H06229425 A | 8/1994 |
| JP | H06294417 A | 10/1994 |
| JP | H07208462 A | 8/1995 |
| JP | H07238939 A | 9/1995 |
| JP | H07279972 A | 10/1995 |
| JP | H08100818 A | 4/1996 |
| JP | H0988971 A | 3/1997 |
| JP | H1037949 A | 2/1998 |
| JP | 2002147466 A | 5/2002 |
| JP | 2002147468 A | 5/2002 |
| JP | 2002180233 A | 6/2002 |
| JP | 2003113842 A | 4/2003 |
| JP | 3538487 B2 | 6/2004 |
| JP | 2004251412 A | 9/2004 |
| JP | 3579917 B2 | 10/2004 |
| JP | 2005140168 A | 6/2005 |
| JP | 3705219 B2 | 10/2005 |
| JP | 2006077944 A | 3/2006 |
| JP | 3778154 B2 | 5/2006 |
| JP | 3821969 B2 | 9/2006 |
| JP | 2006250347 A | 9/2006 |
| JP | 2006329366 A | 12/2006 |
| JP | 2007100914 A | 4/2007 |
| JP | 2007107725 A | 4/2007 |
| JP | 2007170673 A | 7/2007 |
| JP | 2007218368 A | 8/2007 |
| JP | 2007225074 A | 9/2007 |
| JP | 2007225076 A | 9/2007 |
| JP | 2007278332 A | 10/2007 |
| JP | 2007292094 A | 11/2007 |
| JP | 2007292114 A | 11/2007 |
| JP | 2007298060 A | 11/2007 |
| JP | 2008032114 A | 2/2008 |
| JP | 2008050669 A | 3/2008 |
| JP | 2008069924 A | 3/2008 |
| JP | 2008082411 A | 4/2008 |
| JP | 2008082413 A | 4/2008 |
| JP | 2008095884 A | 4/2008 |
| JP | 2008169959 A | 7/2008 |
| JP | 2008281017 A | 11/2008 |
| JP | 1286573 B2 | 7/2009 |
| JP | 2009210090 A | 9/2009 |
| JP | 2009236259 A | 10/2009 |
| JP | 2009287658 A | 12/2009 |
| JP | 2010001934 A | 1/2010 |
| JP | 1437414 B2 | 3/2010 |
| JP | 2010221923 A | 10/2010 |
| JP | 1607071 B2 | 1/2011 |
| JP | 2011117607 A | 6/2011 |
| JP | 1746503 B2 | 8/2011 |
| JP | 1843431 B2 | 12/2011 |
| JP | 4866179 B2 | 2/2012 |
| JP | 1920066 B2 | 4/2012 |
| JP | 1969552 B2 | 7/2012 |
| JP | 1980328 B2 | 7/2012 |
| JP | 5025190 B2 | 9/2012 |
| JP | 2013174303 A | 9/2013 |
| JP | 2013199954 A | 10/2013 |
| JP | 2014081004 A | 5/2014 |
| JP | 2014185741 A | 10/2014 |
| JP | 2015175500 A | 10/2015 |
| JP | 2015209562 A | 11/2015 |
| JP | 2015212576 A | 11/2015 |
| JP | 2015230058 A | 12/2015 |
| JP | 2016014413 A | 1/2016 |
| JP | 5850464 B2 | 2/2016 |
| WO | 2013143807 A1 | 10/2013 |
| WO | 2014174382 A1 | 10/2014 |

* cited by examiner

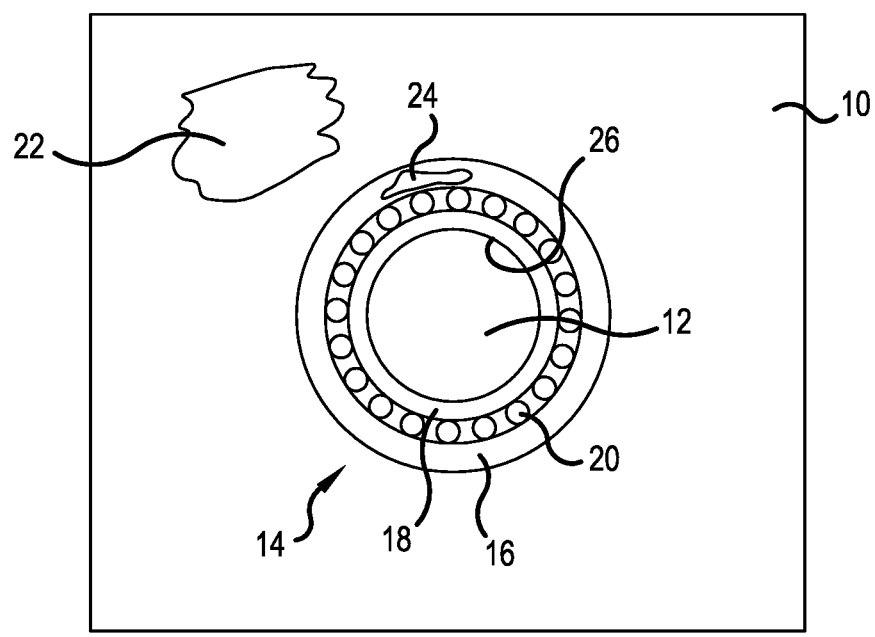

ROLLING-ELEMENT BEARING INCLUDING AN ELECTRICALLY INSULATING LAYER

CROSS-REFERENCE

This application claims priority to German patent application no. 10 2017 205 015.2 filed on Mar. 24, 2017, and German patent application no. 20 2017 101 725.7, filed on Mar. 24, 2017, the contents of which are fully incorporated herein by reference.

TECHNOLOGICAL FIELD

The disclosure is directed to a rolling-element bearing including an electrically insulating layer on a surface of a ring element of the rolling-element bearing, as well as a method for manufacturing a ring of a rolling-element bearing including an electrically insulating layer on a surface. Furthermore, the disclosure is directed to a machine assembly including an electrically insulating layer on a surface of a housing element or of a machine part.

BACKGROUND

Rolling-element bearings including a ceramic coating on a surface of an outer ring are already known in order to prevent a passage of current through the bearing. The ceramic coating acts as an electrically insulating layer.

Bearing rings are known from DE 10 2013 104 186 A1 (family member of US 2015/380124) that include a ceramic coating on the surface wherein the coating includes a proportion of pores from 10% to 50% that are filled with a plastic.

Furthermore a rolling-element bearing unit is known from EP 1 528 274 B1 (family member of US 2005/094910) including an electrically insulating layer on a surface of a ring element, wherein the electrically insulating layer is made from a grey aluminum oxide, which includes $Al_2O_3$ mixed with $TiO_2$ wherein the quantity of $TiO_2$ is less than 1% by weight. Although the coating including a proportion of $TiO_2$ has a smaller electrical resistance than a coating made of pure aluminum oxide $Al_2O_3$, the chosen coating has the advantage that due to the proportion of titanium dioxide the coating adheres better to the metallic surface of the ring.

Furthermore a ring of a rolling-element bearing is known from JP 2008050669 A that includes a thermally sprayed ceramic layer on the surface that has a porosity of 2% to 6%. The porosity is filled with an organic sealer.

From JP 5850464 B a ring of a rolling-element bearing is known that includes a spray-coated ceramic layer on the surface, which spray-coated ceramic layer includes a proportion of titanium dioxide $TiO_2$ between 2% and 40%.

From U.S. Pat. No. 8,425,120 B2 a ceramic coating made of aluminum oxide and titanium dioxide on a ring is known that includes a proportion of titanium dioxide $TiO_2$ of 0.01% to 0.02% by weight, and the particle size of aluminum oxide extends from 10 μm to 50 μm, wherein the average size is between 15 μm and 25 μm.

SUMMARY

The object of the disclosure is to further develop a rolling-element bearing including an electrically insulating coating such that in operation the electrical resistance of the layer maintains a reliably high value under different operating conditions with simultaneous thin cross-section of the layer.

The disclosure is characterized in that the electrically insulating layer is configured as a ceramic layer and is manufactured from a mixture of metal oxides containing aluminum oxide $Al_2O_3$ and titanium oxide, wherein the insulating layer includes titanium compounds that contain reduced titanium oxide $TiO_x$ and/or metallic titanium Ti or are comprised of these, and wherein the insulating layer furthermore includes a sealer, which is comprised of a cured synthetic resin.

According to the disclosure the ceramic layer is manufactured from a powder, which is comprised of metal oxides in powder form. The powder used for manufacturing consists essentially of aluminum oxide $Al_2O_3$ and titanium oxide. Here the titanium oxide is present essentially as titanium dioxide $TiO_2$, but it can also contain a secondary amount of substoichiometric titanium oxide $TiO_x$, for example, $TiO_{1.7}$. The inventive ceramic layer on the surface of the ring element essentially contains chemically reduced titanium oxide $TiO_x$ and/or metallic Ti. Here the reduced titanium oxide $TiO_x$ can be present in various valences as titanium (II) oxide TiO, titanium (III) oxide $Ti_2O_3$, and non-stoichiometric suboxides $TiO_x$, for example, $TiO_{1.7}$. Furthermore, the titanium can also be present as non-reduced titanium oxide, titanium (IV) oxide $TiO_2$. However, it is essential here that the ratio in the ceramic layer of reduced titanium oxide, including metallic titanium, to non-reduced titanium dioxide lies at at least 20%, preferably at at least 50%, most preferably lies at at least 80%.

Both in powder form and in ceramic layers, "titanium oxide" refers to compounds of titanium including oxygen, such as titanium (II) oxide TiO, titanium (III) oxide $Ti_2O_3$, titanium (IV) oxide $TiO_2$, and non-stoichiometric titanium suboxides with a composition ranging from TiO to $Ti_2O$.

According to the disclosure the ceramic layer furthermore includes a sealer, which is comprised of a cured synthetic resin. It is advantageous here that the combination of a ceramic layer, which includes reduced titanium oxide and/or metallic titanium, with a synthetic resin leads to an electrically insulating layer, which has a significantly improved electrical insulation effect in a permanently damp environment in comparison to ceramic layers known to date. The water resistance, with regard to the electrical properties, of the ceramic layer is significantly better than in the previously known ceramic layers. It has been found that going from a resistance value in an ideal dry environment to a resistance value in a maximally wet environment the electrical resistance is set to a resistance value that maintains a resistance value higher by at least a factor of 10 in comparison to a comparably sealed ceramic layer, which is comprised exclusively of pure white aluminum oxide $Al_2O_3$.

According to one preferred design it is provided that the synthetic resin contains cured phenolic resin or a cured anaerobic adhesive or is comprised of this.

An anaerobically curing adhesive can be understood to be dimethacrylic acid esters, which, for example, are produced by esterification of methacrylic acid with tetraethylene glycol into tetraethylene glycol dimethacrylate and which then turn by polymerization into a cured methacrylate resin.

It is advantageous here that a sealing with phenolic resin of the ceramic layer containing reduced titanium oxide or titanium supports a curing of the phenolic resin and leads to a stabilizing of the cured phenolic resin. Jointly responsible for this, for example, are the strongly reducing properties of TiO. Furthermore, the reduced titanium oxide inclusions contained in the layer, which effect a metal-catalyzed curing of the alkene radicals of the phenolic resin, can also support a stabilizing. Furthermore, the combination of the inventive ceramic layer with phenolic resin has the advantage that a color change of the sealed layer in the course of time is prevented, since a uniform coloring of the sealed ceramic layer is substantially set immediately after curing. Here a phenolic resin that contains phenol, phenol-2-methyl, and/or propylene has proven particularly advantageous. A further advantage is that due to capillary action the phenolic resin can penetrate into the finest intermediate spaces and pores of the ceramic layer or else can be pressed into these, for example, using vacuum impregnation, and cured there.

The further preferred sealing of the ceramic layer using the anaerobic adhesive such as methacrylate resin has the advantage that the combination of methacrylate resin with the ceramic layer containing the reduced titanium oxide or titanium supports the, preferably radical, polymerization of the methacrylate resin. It is advantageous here that due to capillary action the methacrylate resin can penetrate into the finest intermediate spaces and pores of the ceramic layer or else can be pressed into these, for example using vacuum impregnation, and cured there anaerobically, i.e., under oxygen-free conditions. The titanium compounds, metallic titanium, and reduced titanium oxide present in the layer act here as a catalyst for the cross-linking, i.e., curing of the methacrylate resin. Due to the preferred combination of metallic titanium and/or reduced titanium oxide in the ceramic layer with methacrylate resin as organic sealer it has surprisingly been found that under damp environmental conditions the ceramic layer is ideally suited as an electrical insulation layer even though the layer includes metallic titanium or TiO as an electrical conductor and/or reduced titanium oxide as a semiconductor. It is advantageous here that due to the presence of the reduced titanium oxide and/or the metallic titanium the curing of the resin can proceed completely, since reduced titanium oxide and/or metallic titanium that is adjacent to pores filled with resin and thus in direct contact with the resin serve as individual starting points for an anaerobic radical polymerization. If these starting points are uniformly distributed in the ceramic layer a complete polymerization of the resin takes place in the entire layer. Instead of methacrylate resin other anaerobic adhesives can also be used, which cure catalytically in an analogous manner in interaction with the reduced titanium oxide.

A preferred design provides that the cured anaerobic methacrylate resin contains polymerized polyethylene glycol dimethacrylate. Triethylene glycol dimethacrylate and tetraethylene glycol dimethacrylate have been found to be particularly advantageous here as components of the methacrylate resin. Furthermore, cyclohexadiene or isobenzofurandione or maleic anhydride, alone or in combination, is advantageous as an additional component.

One preferred design provides that the ceramic layer has a porosity less than 40%, preferably less than 12%, and that the pores have an average diameter between 0.5 µm and 20 µm, preferably between 0.5 µm and 7 µm, wherein the pores are filled with the cured synthetic resin. It is advantageous with this combination of porosity and average pore size that the synthetic resin used reliably penetrates the entire ceramic layer prior to the curing, since due to the chosen porosity and pore size, resin reservoirs are distributed uniformly in the layer, which resin reservoirs are connected to one another to the greatest possible extent by capillaries. The liquid synthetic resin can thereby be applied onto the surface of the ceramic layer and penetrates it reliably over the entire depth, for example, by capillary action.

A further preferred design provides that the reduced titanium oxide and the metallic titanium contained in the ceramic layer and are formed as inclusions, which usually have a significantly larger average extension in a direction parallel to the surface of the ceramic layer than in a direction perpendicular to the surface of the ceramic layer. Inclusions are preferably formed lamella-like or scale-like (in English "flat"). Here inclusions preferably have an average extension <15 µm, preferably less than 5 µm in the direction perpendicular to the surface of the ceramic layer. Parallel to the surface of the ceramic layer, i.e., in the longitudinal extension of the scale-like inclusions, these have an average extension of 5 µm to 80 µm. It is advantageous in this scale-like design of the inclusions including reduced titanium oxide and/or titanium that these inclusions have a very large surface area with respect to their volume, compared to spherical inclusions. At least larger inclusions have such a scale-like structure. Due to the large surface area it is ensured that sufficient pores are directly adjacent to a surface of these inclusions. Thus they can be in catalytically operative contact with the resin. Due to the orientation of the scale-like inclusions parallel to the surface, the possibility that resin penetrating perpendicular to the surface on its way into the depth of the ceramic layer meets a scale-like inclusion of reduced titanium oxide or titanium, which inclusion is thus oriented perpendicular to the penetration direction, is significant. Due to the advantageous ratio of surface area to volume of at least larger inclusions, overall the proportion of the titanium compounds in the ceramic layer can be kept low without bringing the surface area of the inclusion that is in contact with the resin below a value required for a reliable catalytic polymerization. Since titanium compounds represent an electrical semiconductor or even an electrical conductor, from this point of view a lower proportion of titanium compounds is desirable. In other words, if the inclusions of the titanium compounds in the ceramic layer were formed spherical with the same proportion over all sizes, a surface area available for contact with the resin would be significantly smaller. In order to obtain an identical surface area the proportion of titanium compounds would have to be increased, which negatively impacts the electrical resistance of the ceramic material.

A preferred design provides that the proportion of aluminum oxide $Al_2O_3$ in the ceramic layer is 96% to 99.7% weight percentage and the proportion of the titanium compounds is 0.3 to 4% weight percentage. A proportion of 1%-2% of the titanium compounds in the ceramic layer is particularly preferred. Each titanium compound in the ceramic layer, i.e., possibly titanium dioxide $TiO_2$, Titanium (II) oxide TiO, Titanium (III) oxide $Ti_2O_3$, substoichiometric titanium oxide $TiO_x$, and metallic titanium Ti, counts as a proportion of titanium compound.

Here a preferred layer thickness falls between 10 µm and 3000 µm, further preferably between 750 µm and 3000 µm.

According to a further aspect of the disclosure a method for manufacturing a ring element of an inventive rolling-element bearing is proposed. According to the disclosure an electrically insulating layer is provided on a surface of the ring element, wherein the electrically insulating layer is manufactured by a thermal spraying method, including the steps:

Providing a powder that contains aluminum oxide $Al_2O_3$ and titanium oxide,

Thermal spraying the powder onto a surface of the ring element,

Applying an organic sealer onto the sprayed-on layer.

According to the disclosure, with the spraying of the powder containing aluminum oxide $Al_2O_3$ and titanium oxide, the titanium oxide contained in the powder is at least partially chemically reduced to $TiO_x$ and/or TiO and/or to metallic titanium Ti.

As a further preferred step the sealer cures after application in interaction with the titanium oxide at least partially chemically reduced to $TiO_x$ and/or TiO and/or to metallic titanium Ti.

For better layer adhesion the to-be-coated surface of the ring element is preferably cleaned prior to the thermal spraying and subsequently dried and/or additionally sandblasted.

It is advantageous here that in the finished manufactured ceramic layer the proportion of reduced titanium oxide can be significantly increased as compared to the initial powder. Preferably the powder need contain essentially no reduced titanium oxide, but rather can contain exclusively titanium (IV) oxide $TiO_2$ as titanium oxide. Here due to the thermal spraying method the titanium dioxide $TiO_2$ can be chemically reduced to titanium (II) oxide TiO, titanium (III) oxide $Ti_2O_3$, and non-stoichiometric suboxides $TiO_x$, for example, TiO 7. Furthermore, the titanium dioxide $TiO_2$ can be reduced to metallic titanium Ti. However, a powder can also be used as initial powder, which already includes a proportion of reduced titanium oxide in addition to titanium dioxide $TiO_2$. According to the disclosure, due to the thermal spraying method, the proportion of reduced titanium oxide and/or metallic titanium can then be increased.

One preferred embodiment of the method provides that the thermal spraying method is a plasma spraying method. Alternatively the thermal spraying method can also be a high-speed flame spraying. Furthermore, the thermal spraying method can alternatively also be a thermal suspension spraying method.

It is advantageous that by plasma spraying or high-speed flame spraying a chemical reduction of titanium compounds can be precisely controlled such that reduced titanium oxide and/or metallic titanium is contained in the sprayed-on layer.

One preferred embodiment of the method provides that the thermal spraying method is carried out with argon and/or hydrogen as a component of the process gas.

Here the gas mixture used to melt the supplied coating powder is referred to as the process gas. The process gas is so hot here that it can be in plasma form.

Here the hydrogen contained in the plasma effects a chemical reduction of the titanium compounds. The quantity of the chemical reduction can be particularly reliably controlled by plasma spraying. Thus, for example, the reduction components and their proportion in the sprayed layer can be precisely set via the ratio of argon to hydrogen in the plasma. An increase of the hydrogen proportion in the plasma increases, for example, the proportion of metallic titanium in the end product of the chemical reduction. Alternatively the spraying method can also be carried out with nitrogen or helium as the plasma process gas. The reduction components and their proportions in the sprayed layer can also be precisely set via different process gases.

Furthermore, the reduction proportion can be controlled by a dwell time of the powder in the plasma, which in turn can be set via the gas flow and/or gas pressure in the plasma and the route. The reduction components and their proportions in the sprayed layer can likewise be controlled via the temperature of the plasma. Preferably the plasma spraying is carried out at a plasma temperature over 10,000 Kelvin.

Furthermore, the pore size in the sprayed layer as well as the size and the shape of the inclusions containing titanium compounds in the sprayed layer can be set by suitable parameters in the plasma spraying. One preferred embodiment of the method is to carry out the method such that the porosity, the average pore size, and the average size of the inclusions arise in the sprayed layer in various directions with respect to the surface of the sprayed layer as explained above.

One preferred embodiment of the method provides that a sealer containing methacrylate resin is applied as organic sealer, which is anaerobically polymerized in pores of the sprayed-on layer under mediation of the reduced titanium oxide. It is advantageous that the electrically insulating layer thereby has a particularly good moisture resistance. The reduced titanium oxide acts here as already described as a metallic catalyst for the anaerobic polymerization of the resin.

In a further preferred embodiment of the method, providing a powder that contains aluminum oxide $Al_2O_3$ and titanium dioxide is effected using a powder with an average grain size, depending on the thermal spraying method, of 0.01 μm to 63 μm, preferably when using the plasma spraying method between 5 μm to 63 μm, most preferably between 10 μm to 30 μm. In one preferred embodiment before the powder is provided a first powder is made from a powder containing aluminum oxide $Al_2O_3$ and a powder containing titanium dioxide in a desired mixture ratio that corresponds to the ratio of aluminum oxide $Al_2O_3$ and all titanium compounds in the sprayed layer. It is preferably provided that the corresponding mixed first powder is melted and homogenized. The cooled solid metal oxide block is subsequently ground to form a second powder. It is advantageous here that the proportion of titanium compounds in the first and in the second powder overall remains the same; however, the proportion of grains in the powder which contain titanium compounds is significantly larger in the second powder than in the first powder, since in the first powder the grains are comprised either of aluminum oxide $Al_2O_3$ or titanium dioxide. In the second powder the individual grains are already comprised of a mixture of aluminum oxide $Al_2O_3$ and titanium compounds. It is advantageous here that due to a second powder so manufactured the average size of the inclusions containing titanium compounds can be reduced in comparison to a first powder with the same proportion of titanium compounds. A further advantage is the increased homogeneity and more uniform distribution of the inclusions including titanium compounds in the sprayed layer. Alternatively, the powder can be manufactured from a powder containing aluminum oxide $Al_2O_3$, which is melted, and a powder containing titanium dioxide, which is added into the molten aluminum oxide $Al_2O_3$ in a desired mixing ratio and homogenized to a melt. Here concentration shifts due to melt losses are taken into consideration in both manufacturing methods in the mixing ratio of the melt. The cooled solid metal oxide block is subsequently ground to form a second powder. The above-described advantages apply in both manufacturing methods of the powder.

A further aspect of the disclosure relates to a machine assembly including a machine part rotatably disposed in a housing element, wherein the machine part is supported in the housing element using a rolling-element bearing, wherein a first surface of the rolling-element bearing is in contact with a surface of the housing element, and a second surface of the rolling-element bearing is in contact with a surface of the machine part, wherein the surface of the housing element and/or the surface of the machine part includes an electrically insulating ceramic layer that is manufactured from a mixture of metal oxides containing aluminum oxide $Al_2O_3$ and titanium oxide wherein the insulating layer includes titanium compounds that contain reduced titanium oxide TiO$_x$ and/or TiO and/or metallic titanium Ti or are comprised of these, and wherein the insulating layer furthermore includes a sealer that is comprised of a cured synthetic resin.

BRIEF DESCRIPTION OF THE DRAWING

The FIGURE is a schematic side elevational view of a rolling-element bearing according to the disclosure mounted in a housing of a machine assembly.

DETAILED DESCRIPTION

Referring now to the drawing, which is provided for the purpose of illustrating an embodiment of the disclosure only and not for the purpose of limiting same, the FIGURE shows a machine housing 10 in which a machine part 12 in the form of a shaft is mounted for rotation. A bearing 14 having an outer ring 16 and inner ring 18 and a plurality of roller elements 20 rotatably supports the machine part 12 for rotation relative to the housing 10. A surface 22 of the housing 10 and/or a surface 24 of the bearing 14 and/or a surface 26 of the machine part is coated with an insulative coating according to the disclosure. The locations of the insulative coatings in the FIGURE are illustrative, and the coatings can be formed on any surface of the housing and/or the bearing and/or the machine part.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling-element bearings having insulative layers.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A rolling-element bearing comprising:
    a first ring element;
    a second ring element;
    a plurality of rolling elements rotatably disposed between the first ring element and the second ring element, and
    an electrically insulating layer on a surface of the first ring element,
    wherein the electrically insulating layer comprises a ceramic layer containing a mixture of a) aluminum oxide and b) reduced titanium oxide and/or metallic titanium (Ti), and the electrically insulating layer further comprises a cured synthetic resin sealer.

2. The rolling-element bearing according to claim 1, wherein the synthetic resin comprises a cured phenolic resin.

3. The rolling-element bearing according to claim 2, wherein the cured phenolic resin contains phenol, phenol-2-methyl, and/or propylene.

4. The rolling-element bearing according to claim 1, wherein the synthetic resin comprises a cured anaerobic adhesive.

5. The rolling-element bearing according to claim 1, wherein the synthetic resin comprises a cured methacrylate resin.

6. The rolling-element bearing according to claim 5, wherein the cured methacrylate resin contains polymerized polyethylene glycol methacrylate.

7. The rolling-element bearing according to claim 6, wherein the polymerized polyethylene glycol methacrylate comprises triethylene glycol methacrylate and/or tetraethylene glycol methacrylate.

8. The rolling-element bearing according to claim 1, wherein the ceramic layer has a porosity less than 40% and the pores have an average diameter between 0.5 μm and 20 μm and wherein the pores are filled with the cured synthetic resin.

9. The rolling-element bearing according to claim 1, wherein the ceramic layer has a porosity less than 12%, and the pores have an average diameter between 0.5 μm and 7 μm, and wherein the pores are filled with the cured synthetic resin.

10. The rolling-element bearing according to claim 1, wherein a proportion of the aluminum oxide in the ceramic layer is 96% to 99.7 weight % and a proportion of the reduced titanium oxide and/or metallic titanium is 0.3 to 4 weight %.

11. The rolling-element bearing according to claim 1, wherein the ceramic layer contains reduced titanium oxide.

12. The rolling-element bearing according to claim 1, wherein the ceramic layer contains metallic titanium.

13. A machine assembly comprising:
    a machine part rotatably supported in a housing by a rolling-element bearing having an inner ring and an outer ring,
    wherein a first surface of the rolling-element bearing is in contact with a surface of the housing element and a second surface of the rolling-element bearing is in contact with a surface of the machine part,
    wherein the surface of the housing element and/or the surface of the machine part includes an electrically insulating ceramic layer comprising a mixture of a) aluminum oxide and b) reduced titanium oxide and/or metallic titanium Ti, and the electrically insulating layer further comprises a cured synthetic resin sealer.

14. The machine assembly according to claim 13, wherein the electrically insulating ceramic layer contains reduced titanium oxide.

15. The machine assembly according to claim 13, wherein the electrically insulating ceramic layer contains metallic titanium.

* * * * *